(12) United States Patent
Tsao et al.

(10) Patent No.: US 8,547,506 B2
(45) Date of Patent: Oct. 1, 2013

(54) COLOR FILTER SUBSTRATE WITH BLACK MATRIX ON UNDERCUT GROOVE AND FABRICATING METHOD THEREOF

(75) Inventors: Chun-Chieh Tsao, Taoyuan County (TW); Su-Chin Lee, Taichung County (TW)

(73) Assignee: Au Optronics Corporation, Hsinchu (TW)

( * ) Notice: Subject to any disclaimer, the term of this patent is extended or adjusted under 35 U.S.C. 154(b) by 887 days.

(21) Appl. No.: 12/370,611

(22) Filed: Feb. 13, 2009

(65) Prior Publication Data

US 2010/0033658 A1 Feb. 11, 2010

(30) Foreign Application Priority Data

Aug. 6, 2008 (TW) .............................. 97129839 A

(51) Int. Cl.
  *G02F 1/1335* (2006.01)
  *G02F 1/1333* (2006.01)
  *G09G 3/36* (2006.01)
(52) U.S. Cl.
  USPC .............................. 349/106; 349/158; 345/88
(58) Field of Classification Search
  USPC ..................... 349/106, 158; 345/88
  See application file for complete search history.

(56) References Cited

U.S. PATENT DOCUMENTS

| | | | | |
|---|---|---|---|---|
| 5,891,597 A | * | 4/1999 | Lee | 430/7 |
| 2003/0076609 A1 | * | 4/2003 | Kawase | 359/885 |
| 2004/0038138 A1 | * | 2/2004 | Kiguchi et al. | 430/7 |
| 2004/0070705 A1 | * | 4/2004 | Kobayashi | 349/106 |
| 2005/0046769 A1 | * | 3/2005 | Yi et al. | 349/106 |
| 2007/0172774 A1 | * | 7/2007 | Limb et al. | 430/322 |
| 2007/0252927 A1 | * | 11/2007 | Ichihashi et al. | 349/106 |
| 2010/0007975 A1 | * | 1/2010 | Tsao et al. | 359/891 |
| 2011/0149216 A1 | * | 6/2011 | Minato et al. | 349/106 |

FOREIGN PATENT DOCUMENTS

| | | |
|---|---|---|
| JP | 8-146214 | 6/1996 |
| JP | 2001350138 | 12/2001 |
| TW | 200528807 | 9/2005 |
| TW | 200630648 | 9/2006 |
| TW | 200710495 | 3/2007 |

OTHER PUBLICATIONS

"Office Action of Taiwan Counterpart Application", issued on Mar. 30, 2012, p. 1-p. 11, in which the listed references were cited.

* cited by examiner

*Primary Examiner* — Hoan C Nguyen
(74) *Attorney, Agent, or Firm* — Jianq Chyun IP Office

(57) ABSTRACT

A color filter substrate including a substrate, a black matrix layer and a color filter substrate layer is provided. The substrate has a plurality of grooves. The black matrix layer is disposed on the substrate between each two adjacent grooves, wherein the black matrix layer extends to the region above the groove from the edge of the groove and an undercut profile forms between the bottom of black matrix and the substrate. The color filter layer including a plurality of filter films separated is filled in the plurality of grooves and the plurality of filter films is separated from each other by the black matrix layer. In addition, a method of fabricating a color filter substrate is also provided. The above-mentioned color filter substrate and the fabricating method thereof can improve the quality and color uniformity of the color filter substrate.

16 Claims, 13 Drawing Sheets

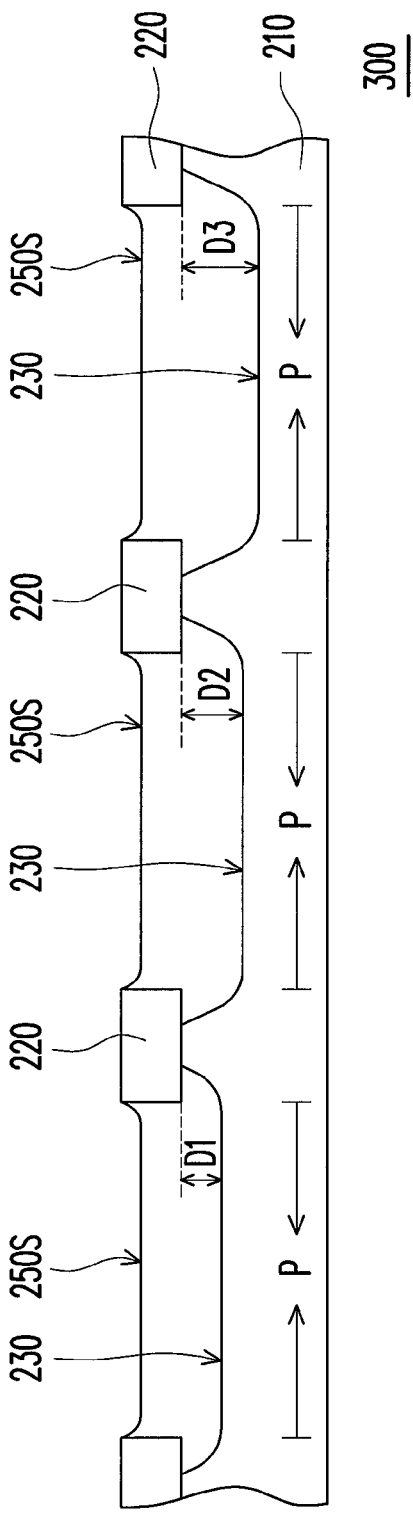
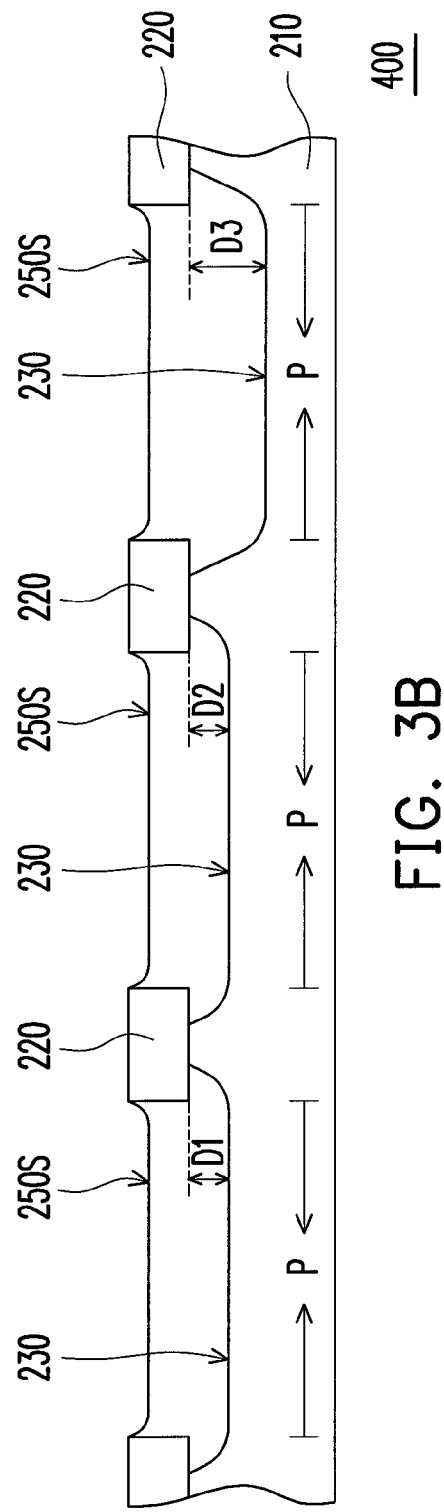
FIG. 3A
FIG. 3B

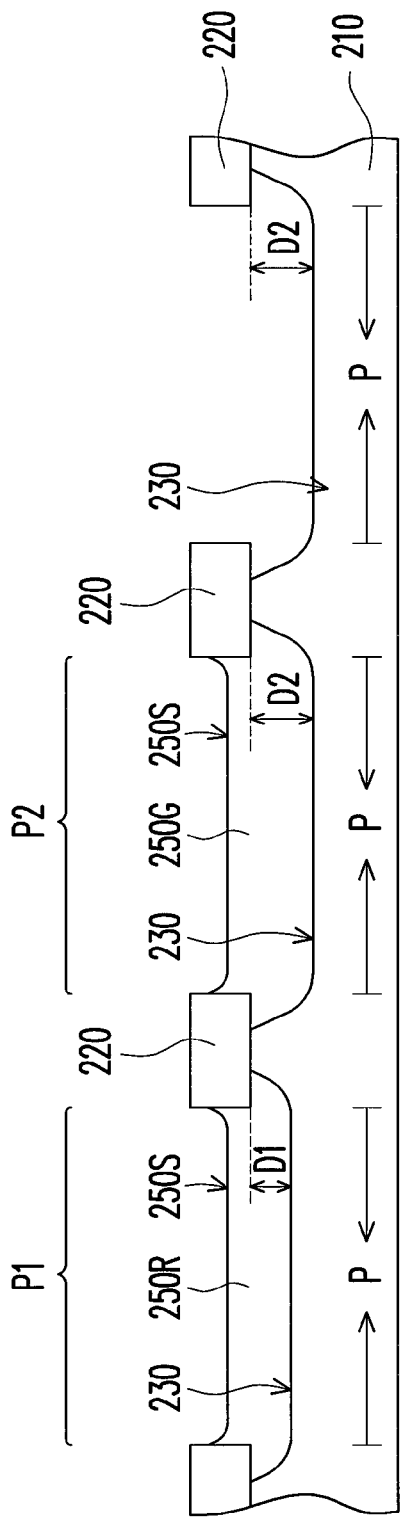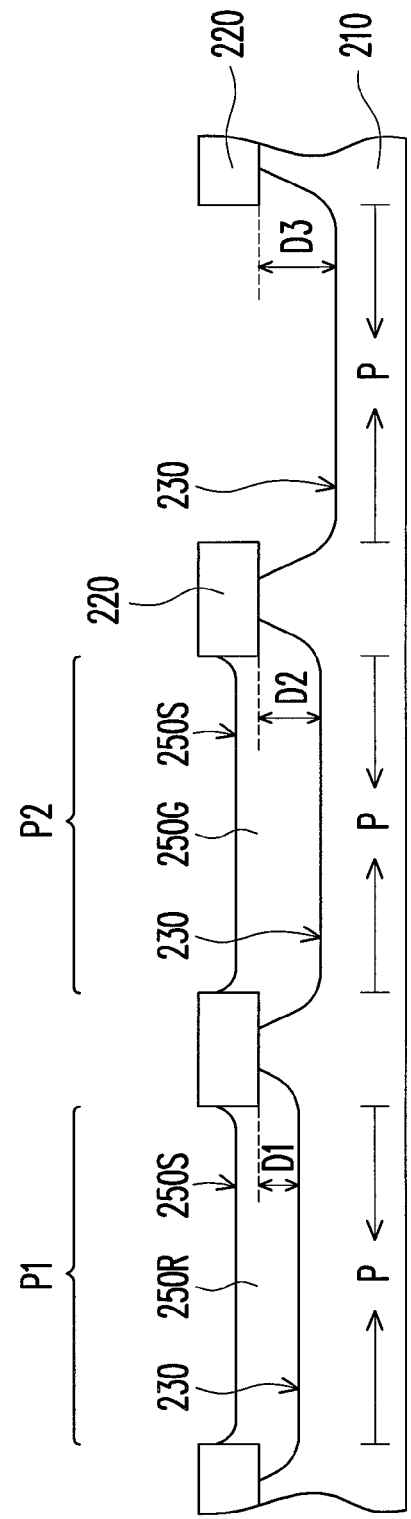

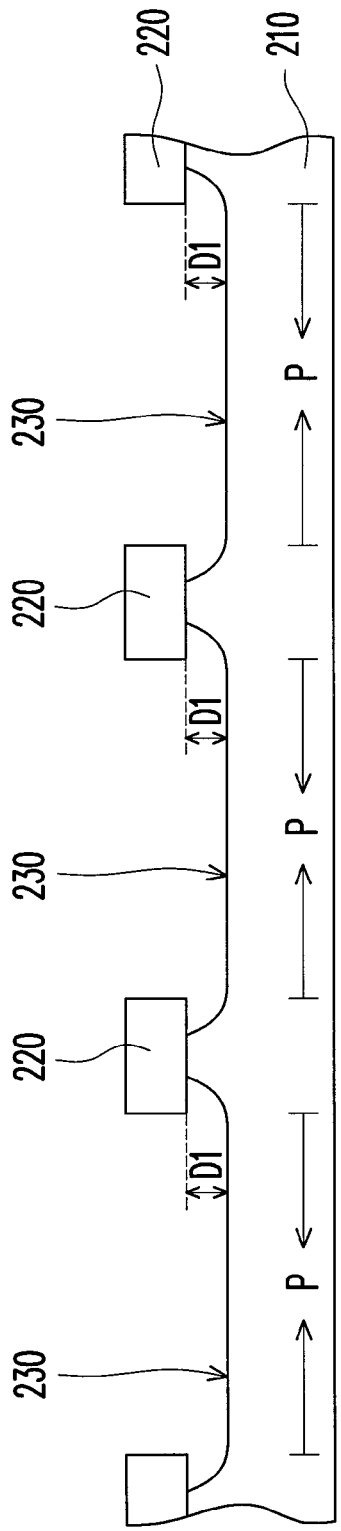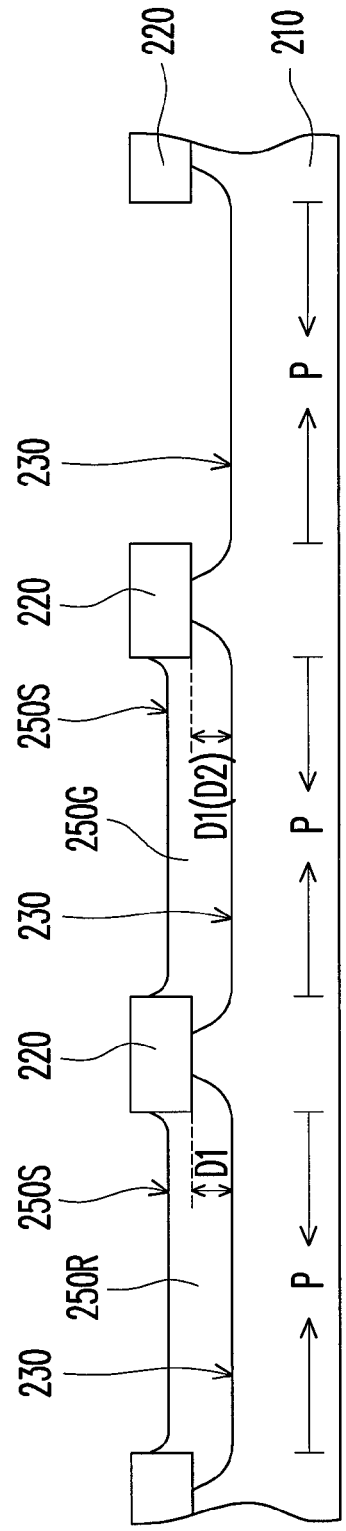
FIG. 5A
FIG. 5B

COLOR FILTER SUBSTRATE WITH BLACK MATRIX ON UNDERCUT GROOVE AND FABRICATING METHOD THEREOF

CROSS-REFERENCE TO RELATED APPLICATION

This application claims the priority benefit of Taiwan application serial no. 97129839, filed on Aug. 6, 2008. The entirety of the above-mentioned patent application is hereby incorporated by reference herein and made a part of specification.

BACKGROUND OF THE INVENTION

1. Field of the Invention

The present invention relates to a component of a display panel and a method for fabricating thereof. More particularly, the present invention relates to a color filter and a method for fabricating thereof.

2. Description of Related Art

With the advantages of high resolution, small volume, light weight, low drive voltage, low power consumption, and a wide range of applications, the liquid crystal display (LCD) has replaced the cathode ray tube (CRT) as the mainstream of the new generation display. In general, the method for fabricating a color filter substrate of an LCD includes three photolithography processes by using color photo resists with primary colors, wherein three color filter films are formed in sequence in corresponding pixel regions on a substrate and form the color filter substrate. More specifically, the color filter films are formed by coating color photo resists on the substrate. The method of coating color photo resists is usually performing spin coating to uniformly coat on the substrate. Therefore, a great part of the color photo resist is wasted in the spin coating process and the fabricating cost is increased. In addition, in order to uniformly distribute the color photo resists during the coating process, a large amount of organic solvent is generally used in the color photo resist. Other processes such as a soft bake or a hard bake process are performed after the coating process to cure the color photo resist to form the color filter film.

A conventional technology which uses an inkjet printing (IJP) process to form a color filter substrate has been developed. The IJP process may print color inks of three primary colors to formed color filter films in pixel regions. Compared with the conventional photolithography process of fabricating color filter films, the IJP process may reduce costs of manufacturing and materials. For forming the color filter films, the IJP technology has advantages of saving fabricating cost and large area manufacturing.

The conventional color filter substrate includes a black matrix layer and color filter films of the three primary colors, red, green, and blue. As shown in FIG. 1A, a black matrix player 120 is formed by coating resin photo resist on the substrate and subsequent processes such as soft bake, exposure, development, and hard bake are performed in sequence to form the black matrix layer 120. Next, color ink is inkjet printed in a pixel region P. In addition, a treatment process is generally performed after the black matrix layer is formed to prevent the color inks from overflowing onto the black matrix layer 120, causing color intermixing in the pixel. The surface of the black matrix layer 120 has a hydrophobic characteristic after the treatment process such that the color inks would hardly adhere onto the black matrix layer 120 and flow into the pixel region P.

However, no matter the black matrix layer 120 made of resin photo resist is fabricated by liquid photo resist coating or dry film attaching, the resin photo resist is usually subjected to the abovementioned treatment process by an atmospheric pressure plasma process after exposure, development and hard bake, for example. Some scum 122 may easily remain at the intersection region between the black matrix layer 120 and the substrate 110 after the black matrix layer 120 has been bombarded by plasma. In addition, the scum 122 itself also has a hydrophobic characteristic, resulting in a situation that after color inks are filled in the black matrix layer 120, the edges of the black matrix layer 120 are not filled and thus a color filter layer 130 as shown in FIG. 1B is formed. As such, problems such as light leakage and non-uniform colors may occur and reduce the display quality of the LCD panel. Furthermore, as shown in FIG. 1B, after color inks are filled in the pixel region, influencing factors such as material of the color inks, surrounding environment, and surface tension of the black matrix layer 120 cause the surface of the color filter film to form a convex surface of non-uniform thickness on the substrate and further influence color performance.

SUMMARY OF THE INVENTION

The present invention provides a color filter substrate and a fabricating method thereof which improves the problem that scum formed during a plasma treatment process of the black matrix layer remains at the intersection between a black matrix layer and a substrate, and cause the condition of non-completely filled pixel regions.

The color filter substrate of the present invention includes a substrate, a black matrix layer, and a color filter layer. The substrate includes a plurality of grooves with undercut profiles. The black matrix layer is disposed on the substrate between each two adjacent grooves and extends from the edge of the grooves to the region above the grooves such that the undercut profile is formed between the black matrix layer and the substrate. The color filter layer including a plurality of color filter films is filled in the grooves and the plurality of color filter films separated from each other is formed.

In one embodiment of the present invention, each of the abovementioned grooves has a depth which, for example, uses a contact surface of the substrate and the black matrix layer as a standard and the maximum depth of each groove is substantially equal to one another. In one embodiment, the largest thickness of each filter film is smaller than the sum of the thickness of the black matrix layer and the maximum depth of the each groove. In one embodiment, the maximum depth is substantially less than the thickness of the black matrix layer and is substantially between 0.5 μm and 2 μm, for example. In one embodiment, the maximum depth is substantially 1 μm, for example.

In one embodiment of the present invention, the thickness of the abovementioned color filter layer is substantially less than the thickness of the black matrix layer.

In one embodiment of the present invention, the surfaces of the abovementioned filter films are planar except the area contacting with the sides of the black matrix layer where liquid surface rises due to capillary phenomenon of the inks.

In one embodiment of the present invention, a tangent line is formed on the edge of each groove neighboring the substrate surface and an acute angle is formed between the tangent line and a surface of the substrate surface.

In one embodiment of the present invention, the abovementioned grooves have different depths and the surfaces of the filter films are substantially on a same plane.

In one embodiment of the present invention, the abovementioned grooves have a first depth, a second depth, and a third depth. The filter films include a red filter film, a green filter film, and a blue filter film. The filter films with the same color are filled in grooves with the same depth, and different colors are filled in grooves with the different depths. For example, the red filter film is filled in grooves with the first depth. The green filter film is filled in grooves with the second depth. The blue filter film is filled in grooves with the third depth. In one embodiment, the first depth and the second depth are substantially less than the third depth. The first depth is substantially equal to the second depth. In another embodiment, the first depth and the second depth are substantially larger than the third depth. The first depth is substantially equal to the second depth. In another embodiment, the first depth is substantially smaller than the second depth. The second depth is substantially smaller than the third depth.

In one embodiment of the present invention, the abovementioned color filter substrate further includes a transparent electrode layer which covers the color filter layer and the black matrix layer.

In one embodiment of the present invention, the abovementioned color filter substrate further includes an active array layer disposed on the color filter layer and the black matrix layer.

The present invention further provides a method for fabricating a color filter substrate. The method includes the following steps. First, a substrate is provided. A black matrix layer is formed thereon and separates a plurality of pixel regions on the substrate. Afterward, grooves with undercut profiles are formed in the pixel regions of the substrate using the black matrix layer as a mask. Subsequently, a treatment process is performed on the surface of the black matrix layer. Next, the color filter layer is filled in the grooves using an inkjet method. The color filter layer is automatically separated at the grooves by the black matrix layer and forms a plurality of filter films.

In one embodiment of the present invention, the abovementioned method of forming the grooves in the pixel regions of the substrate includes performing a wet etching process on the substrate. In one embodiment, the wet etching process includes using hydrofluoric acid (HF).

In one embodiment of the present invention, the treatment process includes performing a plasma treatment process.

In one embodiment of the present invention, the abovementioned method of filling color filter layer includes inkjet printing (IJP) to fill color inks in the groove in each pixel region.

In one embodiment of the present invention, the surfaces of the abovementioned filter films are substantially on a same plane.

In one embodiment of the present invention, the abovementioned method of forming the filter films in the grooves includes the following steps. First, a red filter film is filled in the grooves of a first part, wherein the grooves in the first part have a first depth. Afterward, a green filter film is filled in the grooves of a second part, wherein the grooves in the second part have a second depth. Next, a blue filter film is filled in the remaining grooves, wherein the remaining grooves have a third depth. In one embodiment, a treatment process is further performed on the surface of the black matrix layer and the red filter film before filling the green filter film in the grooves with the second depth. In one embodiment, a treatment process is further performed on the surface of the black matrix layer, the red filter film, and the green filter film before filling the blue filter film in the grooves with the third depth.

In one embodiment of the present invention, the part of the substrate in the grooves exposed by the black matrix substrate, the red filter film, and the green filter film is removed using the black matrix substrate, the red filter film, and the green filter film as masks before filling the blue filter film in the grooves with the third depth so that the exposed grooves have. Then, the blue filter film is filled in the grooves with the third depth and makes the surfaces of the filter films to be at a same height. The corresponding depths of the three colors are different so the color filter films of various colors are different. The thicknesses of the filter films may be adjusted based on the material or optical characteristics thereof or according to the requirement of color brightness of the panel. For example, in this embodiment, the thickness of the blue filter film is substantially larger than the thickness of the green filter film and the thickness of the green filter film is substantially equal to the thickness of the red filter film. In addition, in another embodiment, the part of the substrate in the grooves exposed by the black matrix substrate and the red filter film is removed using the black matrix substrate and the red filter film as a mask before filling the green filter film in the grooves with the second depth so that the exposed grooves have the second depth. As a result, the thickness of the blue filter film is substantially larger than the thickness of the green filter film and the thickness of the green filter film is substantially larger than the thickness of the red filter film. The surfaces of the filter films are at a same height.

According to a preferred embodiment of the present invention, the black matrix layer is first formed on the substrate. A plurality of grooves with undercut profiles is formed in the regions separated by the black matrix layer on the substrate. As such, a color filter layer with a flat surface may be formed after color inks are filled in the grooves. Furthermore, scum and the black matrix layer both treated hydrophobically are not co-planar that results to an ineffective hydrophobic tension between inks and scum. Therefore, color inks may be completely filled in every entire pixel region, and thereby improve the quality and yield of the color filter. The LCD panel that uses this color filter also has better display quality.

In order to make the aforementioned features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A and FIG. 3B illustrate the color filter according to the second embodiment of the present invention.

FIG. 4A to FIG. 4E are flow charts of the fabricating process of the color filter as shown in FIG. 3A.

FIG. 5A to FIG. 5D are flow charts of the fabricating process of the color filter as shown in FIG. 3B.

DESCRIPTION OF EMBODIMENTS

Figure 1A:
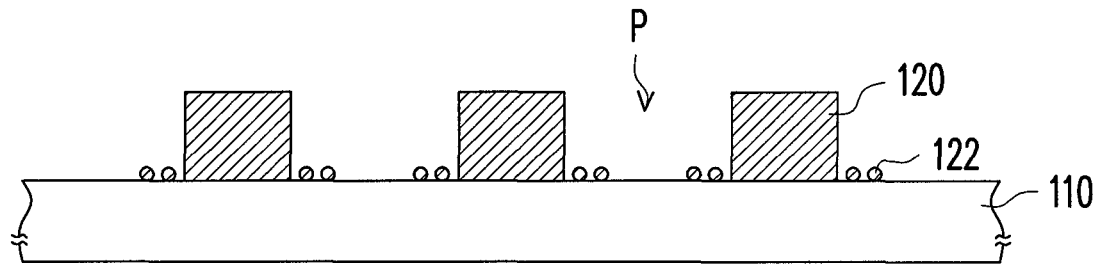
FIG. 1A is a schematic diagram of a conventional black matrix layer formed on a substrate.

In the conventional fabricating process of a color filter substrate, during a treatment process after forming a black matrix layer, scum is generated at the edge of the black matrix layer, which affects a later coating process of color inks. Therefore, in the present invention, grooves with undercut profiles separated from each other are respectively formed in predetermined pixel regions on a substrate after the black matrix layer is formed. As such, even if scum is generated in later fabricating processes, the hydrophobic scum and the black matrix layer are not co-planar. The surface tension of the hydrophobic scum and the surface tension of the hydrophobic black matrix layer have difficulty in strengthening each other mutually. Therefore, color inks may be filled into the pixel regions with ease and the color filter layer thereby formed may completely fill the pixel regions. The black matrix layer extends from the edge of the grooves to the region above the grooves such that the undercut profile is formed between the black matrix layer and the substrate and most of the scum falls within the undercut profile of the grooves. As a result, the black matrix layer blocks the influence of the scum on the pixel display when using the color filter substrate for display. Thus, the technology provided in the present invention may overcome the problem of color inks being not able to completely fill the pixel regions due to the influence of scum. The present invention enables the color filer substrate to have better quality and yield and further enables the LCD panel that uses the color filter substrate to have superior image display quality. Several methods of fabricating a color filter substrate are provided below to illustrate the technical content of the present invention.

The First Embodiment

FIG. 2A to FIG. 2D are schematic diagrams illustrating the flow of the fabricating process of the color filter substrate according to the first embodiment of the present invention. First referring to FIG. 2A, a substrate 210 is provided. The material of the substrate 210 is a transparent material such as glass, quartz, or plastic. Next, a black matrix layer 220 is formed on the substrate 210, wherein the black matrix layer 220 separates a plurality of pixel regions P on the substrate 210. Specifically, a method of forming the black matrix layer 220 on the substrate 210 includes first forming a light-shielding material layer (not shown) on the substrate 210 and then performing a photolithography process on the light-shielding material layer (not shown) to pattern the light-shielding material layer (not shown). In the present embodiment, material of the light-shielding material layer includes resin which has characteristics such as low transparent rate, small reflection factor, and photosensitivity. In addition, after the photolithography process, a pre-baking process may further be performed on the black matrix layer 220. As such, the black matrix layer 220 may be initially cured.

Figure 2A:
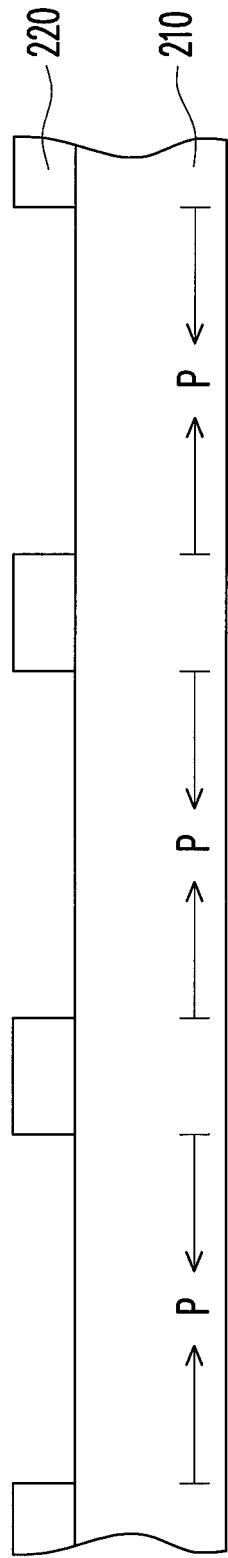
FIG. 2A to FIG. 2D are schematic diagrams illustrating the flow of the fabricating process of the color filter according to the first embodiment of the present invention.
Figure 2B:
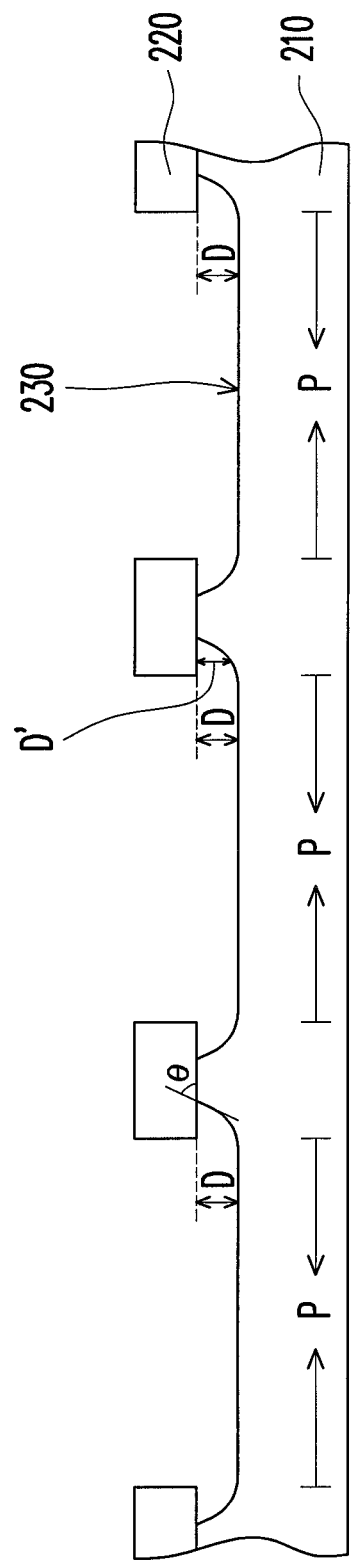

Afterward, as shown in FIG. 2B, grooves 230 with undercut profiles are respectively formed in the pixel regions P on the substrate 210 using the black matrix layer 220 as a mask, wherein the grooves 230 are separated from each other and arranged in array on the substrate 210, for example. The undercut profiles of the groove 230 have a plurality of different depths, for example, a slope formed by depth D and depth D'. The shape of the grooves 230 with the undercut profiles is a U shape, for example. Specifically, the undercut profiles of the grooves 230 extend toward the direction of the black matrix layer 220 and partly underlay the black matrix layer 220. The method of forming the grooves 230 with undercut profiles of a U shape includes performing a wet etching process using an etchant on the substrate 210, for example. More specifically, compared with the black matrix layer 220, the etchant has a higher etching selectivity ratio on the substrate than the black matrix layer 220 so as to remove part of the substrate 210 and form the grooves 230 in the pixel regions P. The etchant is hydrofluoric acid, for example, or other suitable etchant. It should be noted that because the wet etching process is an isotropic etching process, the grooves 230 with undercut profiles may be formed as shown in the figures.

Figure 2C:
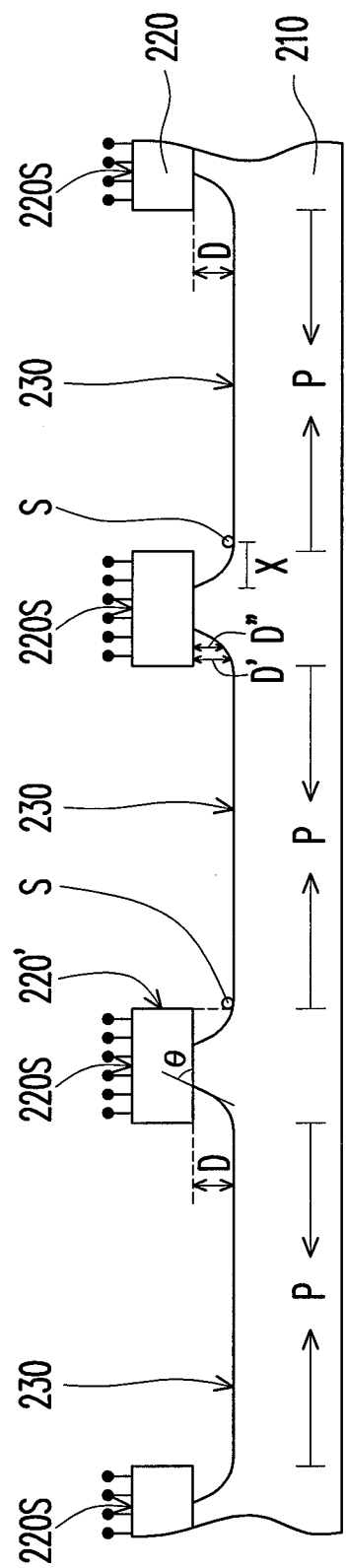

Referring to FIG. 2C, a treatment process is then performed on the surface of the black matrix layer 220. In one embodiment, the treatment process may be a plasma treatment process performed on the black matrix layer 220. The plasma treatment process generally may use plasma containing fluorine to perform a process on the surface of the black matrix layer 220 so that the surface or side surface 220' of the black matrix layer 220 becomes a hydrophobic layer with a hydrophobic characteristic or a hydrophobic surface 220S. Gas used to generate fluorine radicals by the plasma process is tetrafluoride ($CF_4$) or sulfur hexafluoride ($SF_6$), for example. The treatment process has no similar effect on the surface of the substrate 210. In other words, when the treatment process is performed on the surface of the black matrix layer 220, the grooves 230 in the pixel regions P will not become hydrophobic. Thus, the coating characteristic of color inks on the surface of the pixel regions is not affected. The phenomenon that color inks are not completely filled due to the hydrophobic characteristic of the grooves may be prevented.

Furthermore, some scum may be generated during the treatment process. Because the grooves 230 of the present invention have the undercut profiles, the black matrix layer 220 extends from the edge of the grooves 230 (as the first depth D) toward the region above the undercut profiles of the grooves (as the second depth D'). As a result, part of the grooves 230 extend into the projection area of part of the black matrix layer 220 so that part of the grooves 230 underlay part of the black matrix layer 220, wherein the depth D is larger than the depth D' and the area of the undercut profiles is formed. Therefore, most of scum S will fall on the surface of the grooves 230 near the area under the black matrix layer 220, i.e., the undercut profiles of the grooves 230. Compared with a position of scum 122 in a conventional structure as shown in FIG. 1A, the problem that color inks can not completely fill the pixel regions because the scum 122 and the side surface of the black matrix layer 220 form a nearly right angle, generating a greater hydrophobic tension and driving out wet color inks in prior art has been resolved. Thus, in this embodiment, scum S is not adjacent to the side surface of the black matrix layer 220, which has been treated by a hydrophobic surface process, and the angle between scum S and the black matrix is smaller than 90 degree. Therefore, color inks may easily cover the scum S and completely fill the entire pixel regions due to the smaller hydrophobic surface tension compared with prior art.

More specifically, as shown in FIG. 2C, a tangent line is formed on the edge of the grooves 230 neighboring the surface of the substrate 210 and the tangent line forms an acute angle θ with the surface of the substrate 210, wherein 0°<θ<90°. Between the side wall of the grooves 230 and the black matrix layer 220 is a non-display region which enables scum generated in later processes to more easily fall near the projection position of the side surface 220' of the black matrix layer 220 onto the grooves 230. Therefore, the color filter substrate of the present invention may be able to use the undercut profiles U to prevent scum S and prevent the problem that color inks fail to completely fill the pixel regions, affecting color purity of the various color filter films. The present invention may further enhance color saturation of the color filter.

Figure 2D:
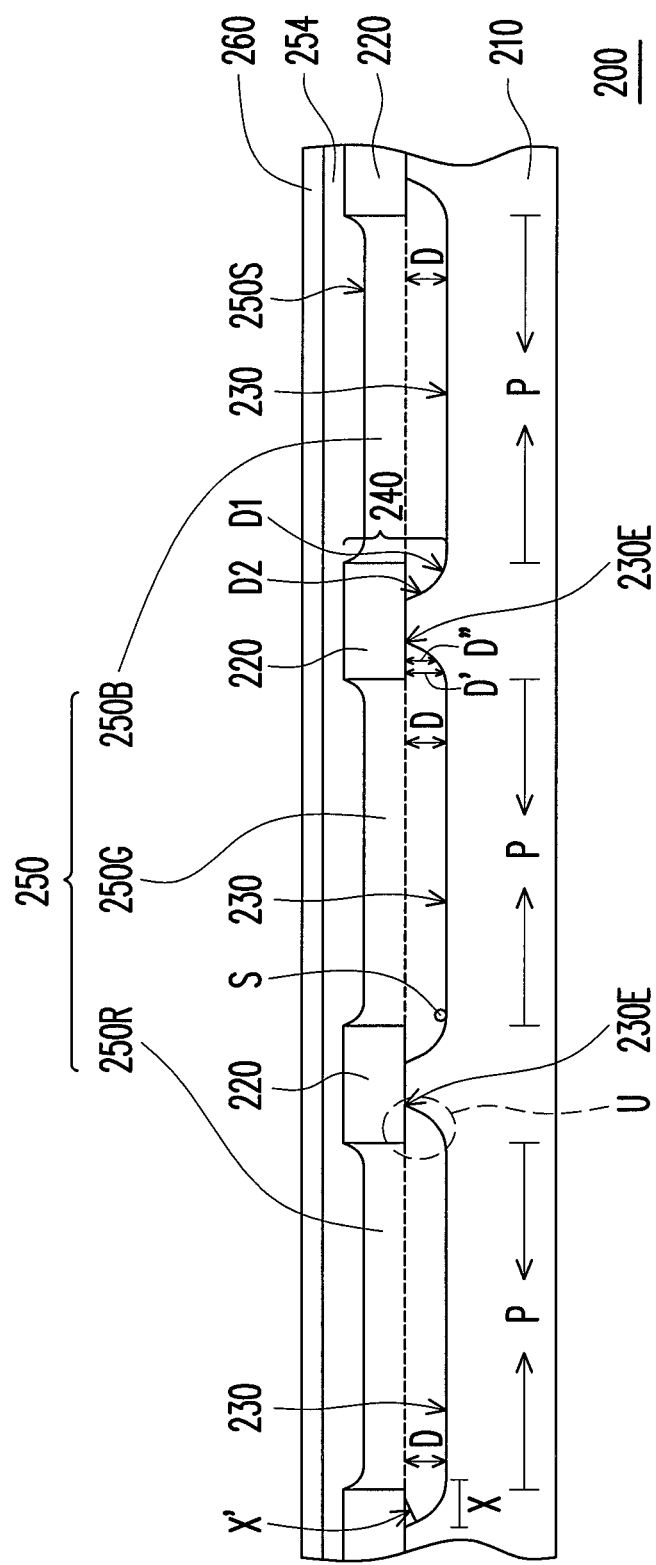

Referring to FIG. 2D, at this time, the black matrix layer 220 and the grooves 230 with the undercut profiles U jointly form a wall 240 in an inkjet process. The wall 240 is between two adjacent pixel regions P. Next, after the wall 240 is formed, color inks are respectively filled in the grooves 230 of each pixel region P. A color filter layer 250 is automatically separated into a plurality of filter films at the area of the grooves 230 through the black matrix layer 220 on the substrate 210. In detail, a method of forming the color filter layer 250 is, for example, using an inkjet head to sequentially or simultaneously inkjet print red, green, or blue color inks in the corresponding pixel regions P. In addition, after forming the color filter layer 250, the color inks may be further sequentially or simultaneously cured so that solvent in the color filter layer 250 may be evaporated.

Furthermore, at the step of filling the color inks in the grooves 230, condition of non-completely filled color inks may still occur at the edge area of the grooves 230, e.g. areas of depth D" smaller than D'. Because the unfilled edge areas of the grooves 230 is the intersection between the pixel region and the black matrix layer 220, i.e. overlapping area X of the black matrix layer 220 and the grooves 230. The design of the grooves 230 makes the unfilled areas appear under the black matrix layer 220 so the unfilled areas occurring in the non-display region would not affect the color performance of color filer substrate due to the shielding effect of the black matrix layer. As a result, the quality of the color filter is not affected due to light leakage does not occur.

After the color filter layer 250 is formed, a transparent electrode layer 260 may further be formed to cover the color filter layer 250 and the black matrix layer 220. Furthermore, a planar layer 254 may selectively be formed between the color filter layer 250 and the transparent electrode layer 260. In detail, material of the transparent electrode layer 260 may be transparent and conductive materials such as indium tin oxide (ITO), indium zinc oxide (IZO), or aluminum zinc oxide (ZAO) which is formed on the color filter layer 250 and the black matrix layer 220 using methods such as physical vapor deposition or sputtering. At this point, the fabrication of the color filter substrate 200 is mostly completed. In the present embodiment, disposition of a protection layer may further flatten the interface between the transparent electrode layer 260 and the color filter layer 250 or fulfill other requirements.

In light of the above, FIG. 2D is a cross sectional schematic diagram of the color filter substrate of the first embodiment of the present invention. Specifically, the color filter substrate 200 mainly comprises the substrate 210, the black matrix layer 220, and the color filter layer 250. The substrate 210 has a plurality of grooves 230 separated from each other. The grooves 230 have the undercut profiles U. The black matrix layer 220 is disposed on the substrate 210 between each two adjacent grooves 230. The black matrix layer 220 extends from the edge of the grooves 230 to the area above the grooves 230 so that part of the grooves 230 extend under part of the black matrix layer 220 and part of the grooves 230 underlay part of the black matrix layer 220. The color filter layer 250 is filled in the grooves 230 and the filter films separated from each other are formed respectively within the grooves 230. In the present embodiment, the color filter layer 250 comprises a plurality of red filter films 250R, a plurality of green filter films 250G, and a plurality of blue filter films 250B, for example. The red filter films 250R, the green filter films 250G, and the blue filter films 250B may be arranged in a stripe type arrangement, a triangle type arrangement, a mosaic type arrangement, or a four pixel type arrangement. The present invention does not limit the type of arrangement of the filter films in the color filter layer 250. In addition, In order to further increase color saturation in the color filter layer 250 and promote overall visual effects of the LCD panel that uses the color filter substrate 200, the depth D of the grooves 230 in the substrate 210 and the relationship between the thickness of the color filter layer 250 and the thickness of the black matrix layer 220 may be adjusted according to product requirements and material characteristics.

In detail, the black matrix layer 220 separates a plurality of pixel regions P on the substrate 210. The grooves 230 are formed by removing part of the substrate 210 in the pixel regions P. The filter films of various colors are then filled in the corresponding grooves 230. In the present embodiment, the depths D of the various filter films filled in the grooves 230 are substantially equal to each other. Here, the depth D is defined as the maximum depth of each groove 230. In practice, the depth D of the grooves 230 may be adjusted according to the material of the filer films, the thickness of the black matrix layer 220, or the product requirement for color saturation so as to increase design margin. For example, the depth D of the grooves 230 is substantially smaller than the thickness of the black matrix layer 220. The depth D of the grooves 230 is substantially between 0.5 µm and 2 µm, for example. In one embodiment, the depth D of the grooves 230 is substantially 1 µm. It should be pointed out that the depth D of the grooves 230 can be defined from the contact surface of the substrate 210 and the black matrix layer 220 as a counting standard to the depth D of the grooves 230.

It should be noted that the problem in the conventional technology that color inks are not completely filled in the pixel regions P during the inkjet printing process may be overcome with the grooves 230 having the undercut profiles U in the color filter layer 250. The chances of the scum 122 causing the unfilled areas in the pixel regions P in prior art may also be lowered. In detail, the grooves 230 of the present invention have the undercut profiles U. The black matrix layer 220 extends from the edge 230E of the grooves 230 to the area above the grooves 230 so that the black matrix layer 220 partly overlap with the grooves 230 at the area of the grooves where the depth is smaller than D, for example. Even if the scum S is generated in later processes, the scum S may more easily fall near the undercut profiles U of the grooves 230. Therefore, in this embodiment scum S is not adjacent to the side surface black matrix layer 220, which has been treated by a hydrophobic surface process. Therefore, color inks may more easily cover the scum S and completely fill the entire pixel regions due to the smaller hydrophobic surface tension compared with prior art.

In light of the above, in the color filer layer 250 of the present invention, the filter films are formed in each of the grooves 230 using an inkjet printing process, for example. Side walls of the black matrix layer 220 and the grooves 230 may together play a role of wall 240 between the filter films in later processes. As a result, the height of the wall 240 is larger than the thickness of the filter films so the problem of intermixing of colors in the pixel regions P may be avoided in the inkjet printing process, and thus the saturation of the jetted colors in the color filter layer 250 is increased. In other words, in the present embodiment, the largest thickness of the filter films is smaller than the sum of the thickness of the black matrix layer and the depth D of the grooves 230. Therefore, the thickness of the color filter layer 250 of the present invention may substantially larger than the thickness of the black matrix layer 220 without colors intermixing. In other words, the present invention uses the thickness of the filter films of various colors to increase color saturation of the various colors. Furthermore, the problem of intermixing of colors does not occur in the actual process of increasing thickness of the filter films.

Figure 1B:
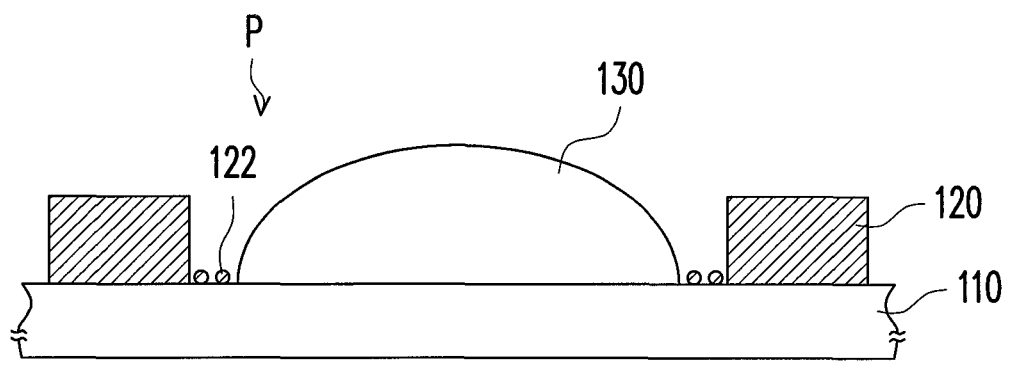
FIG. 1B is a schematic diagram of a sub-pixel of a conventional color filter.

Furthermore, as shown in FIG. 2D, the color filter layer 250 is filled in the grooves 230. During the filling process of the color inks by inkjet printing, the black matrix layer 220 is higher than the surface of the wet color inks so that most of the display area in pixel region P forms a substantially planar surface 250S except the surrounding region of the filter films adjacent to the black matrix layer 220. The reason is that the liquid surface 250S of wet color ink rises from the side wall of the black matrix layer 220 due to capillary force. Therefore, the color filter layer 250 of the present invention has better thickness uniformity than the conventional color filter layer 130 (as shown in FIG. 1B) and further has better color uniformity. In detail, the extreme value of thickness (e.g. the largest thickness) of the color filter layer 130 (as shown in FIG. 1B) which has a convex surface appearing in the center of the pixel region P, a main performance area of the display area. However, the thickness limit (e.g. the smallest thickness) of the color filter layer 250 which has a concave surface appears in the two sides of the pixel region P which is an edge performance area of the display area. Therefore, as compared with the conventional color filter layer 130, the color filter layer 250 of the present invention has better color uniformity.

Figure 2E:
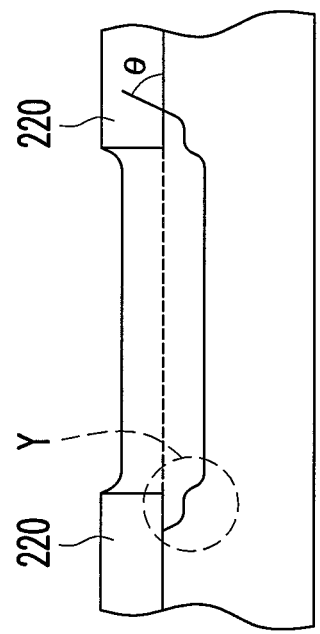
FIG. 2E is another schematic diagram of a color filter of the present invention.
Figure 2E:
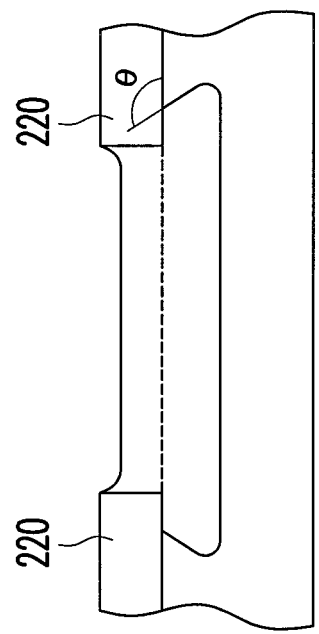

It should be noted that the shape of the grooves of the present invention is not limited to be the abovementioned U shape. For example, the shape of the grooves on the substrate may also be as shown in FIG. 2E. The abovementioned θ may also be an obtuse angle, wherein 90°<θ<180° as shown with the grooves 230A in FIG. 2E. The design of the grooves may also be as shown with the grooves 230B in FIG. 2E. Peripheral surface Y of the grooves 230B under the black matrix layer 220 may also be a stair shape or irregular geometric shape, which is not limited by the present invention herein. That is, the substrate of the present invention includes the grooves with the undercut profiles. The black matrix layer 220 extends to the area above the grooves adjacent to the substrate 210. Therefore, a containing space is formed between the black matrix layer 220 and the grooves so that the color inks may be disposed in the containing space. Part of the grooves and part of the black matrix layer overlap so there is no effect from the scum S adjacent to the side wall of the black matrix layer 220 which has bee treated by a hydrophobic surface process. As a result, quality and color saturation of the color filter substrate 200 are effectively increased.

Continuing from the above embodiment, filter films of various colors may have different material characteristics in practice. Thus, the depth D of the grooves 230 in the present invention may be adjusted according to various colors and various types of materials of the filter films. The color performance of the filer films of various colors may then better satisfy user requirements and further increase overall visual effects of the LCD panel that uses the color filter. Several color filters with grooves having different depths are illustrated as examples below.

The Second Embodiment

FIG. 3A and FIG. 3B further illustrate the color filter substrate according to the second embodiment of the present invention. Referring to FIG. 3A and FIG. 3B, for the purpose of simplification, similar components to those shown in FIG. 2D will not be illustrated again in the present embodiment. Compared with the abovementioned embodiment, grooves 230 that filter films of various colors are filled in have different depths in color filter substrates 300 and 400 of the present embodiment. In detail, the depths of the grooves 230 in the color filter substrates 300 and 400 of the present embodiment may be divided into a first depth D1, a second depth D2, and a third depth D3. For example, red filter films 250R are filled in the grooves 230 with the first depth D1, green filter films 250G are filled in the grooves 230 with the second depth D2, and blue filter films 250B are filled in the grooves 230 with the third depth D3. In the present embodiment, the surfaces of the filter films are substantially on a same plane, and the first depth D1, the second depth D2, and the third depth D3 is respectively presents the maximum value of depth in corresponding groove.

First referring to FIG. 3A, the first depth D1 of the grooves 230 of the color filter substrate 300 is substantially smaller than the second depth D2 and the second depth D2 is substantially smaller than the third depth D3. In other words, D1<D2<D3. In the present embodiment, the surfaces of the red filter film 250R, the green filter film 250G, and the blue filter film 250B are substantially on a same plane, which is not limited by the present invention herein, however. As shown in FIG. 3A, the thickness of the red filter film 250R is smaller than the thickness of the green filter film 250G and the thickness of the green filter film 250G is smaller than the thickness of the blue filter film 250B.

Referring to FIG. 3B, the first depth D1 of the grooves 230 of the color filter and the second depth D2 are substantially smaller than the third depth D3 and the first depth D1 is substantially equal to the second depth D2. In other words, D1=D2<D3. In the present embodiment, the thickness of the red filter film 250R is substantially equal to the thickness of the green filter film 250G and the thickness of the blue filter film is substantially larger than the thickness of the red filter film 250R and the thickness of the green filter film 250G. For example, the thickness of the blue filter film is about 1.9 μm and the thickness of the red filter film 250R and the green filter film 250G is about 1.8 μm. Certainly, in another embodiment, the relationship between the first depth D1, the second depth D2, and the third depth D3 may also be D1=D2>D3. Therefore, the present invention does not limit the depth of the grooves 230, the thickness of the filter films, the depth relationship among the grooves 230, and the surface height relationship and the thickness relationship among the filter films, which may be set according to material characteristics of the color filter layer 250 and product design requirements.

In addition, taking the color filter substrate 300 in FIG. 3A as an example, a method for fabricating of a color filter substrate is provided below and illustrated in the same manner as FIGS. 2A-2D. FIG. 4A to FIG. 4E are flow charts of the fabricating process of the color filter substrate as shown in FIG. 3A.

Figure 4A:
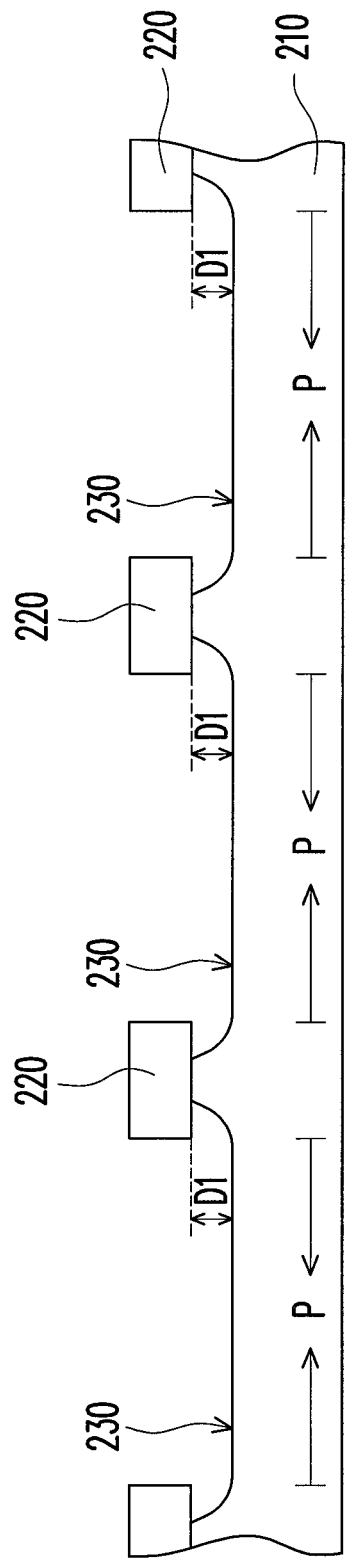
Figure 4B:
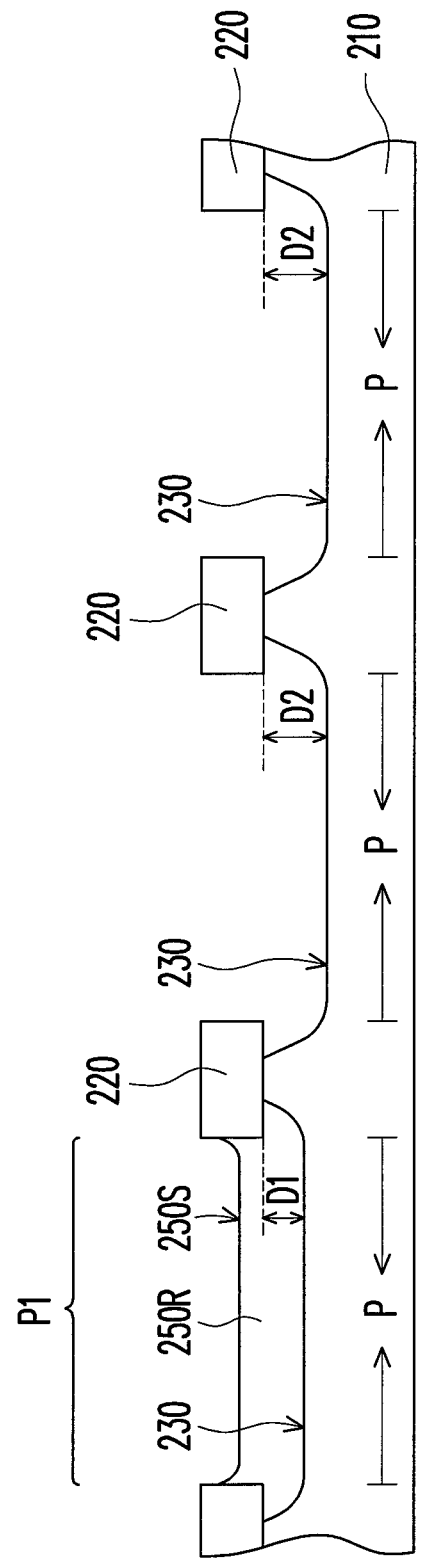

For the purpose of simplification, fabricating processes similar to those in FIG. 2A to FIG. 2D are not illustrated again in the following. As shown in FIG. 4B, compared with the abovementioned embodiment, in the present embodiment, after forming grooves 230 of a first depth D1, a red filter film 250R is formed in the grooves 230 of a first part P1, wherein the method of forming the red filter film 250R is the same as mentioned in previous sections and will not be further illustrated hereinafter. Next, part of a substrate 210 exposed by a black matrix layer 220 and the red filter film 250R is removed using the black matrix layer 220 and the red filter film 250R as a mask so that the exposed grooves 230 have a second depth D2. The abovementioned method of removing part of the substrate 210 is, for example, performing a wet etching process using hydrofluoric acid (HF).

Figure 4E:
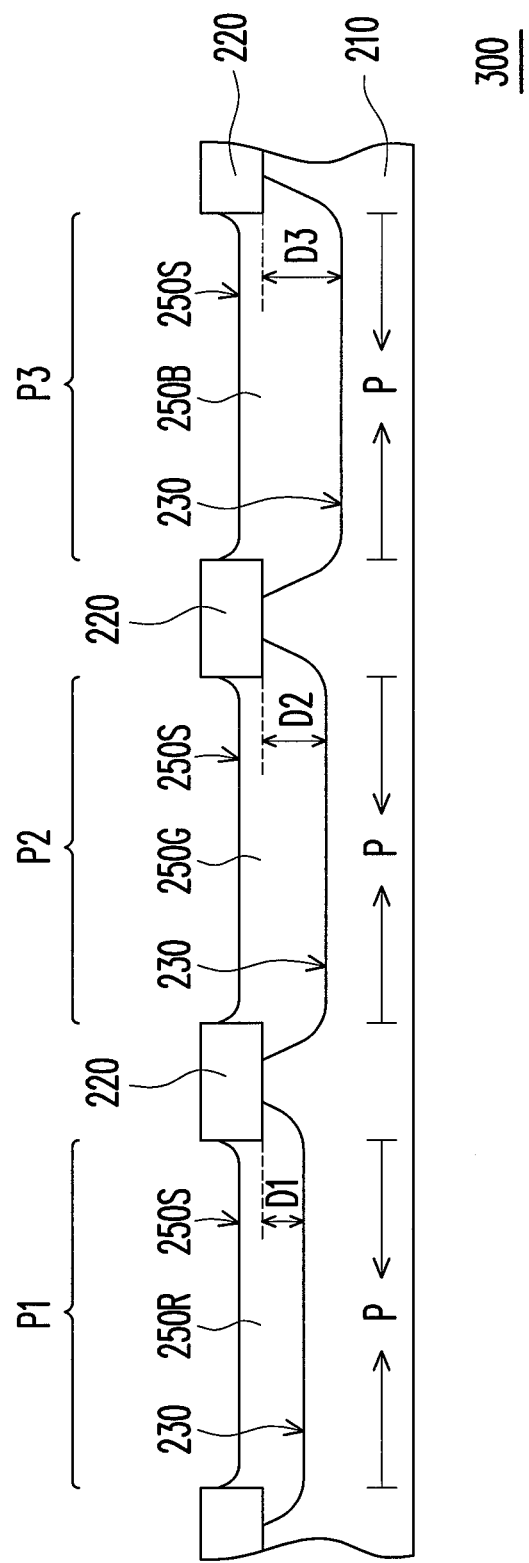
Figure 5C:
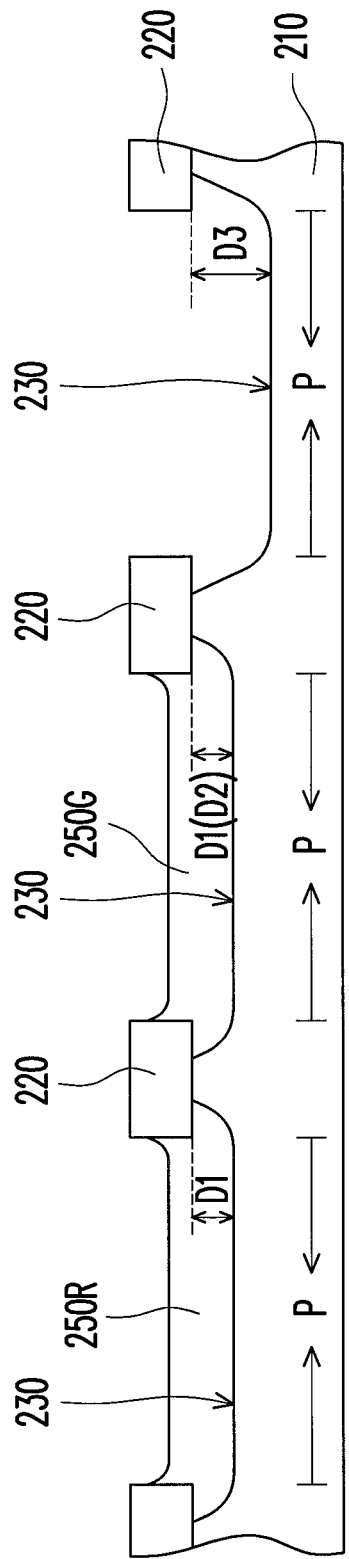
Figure 5D:
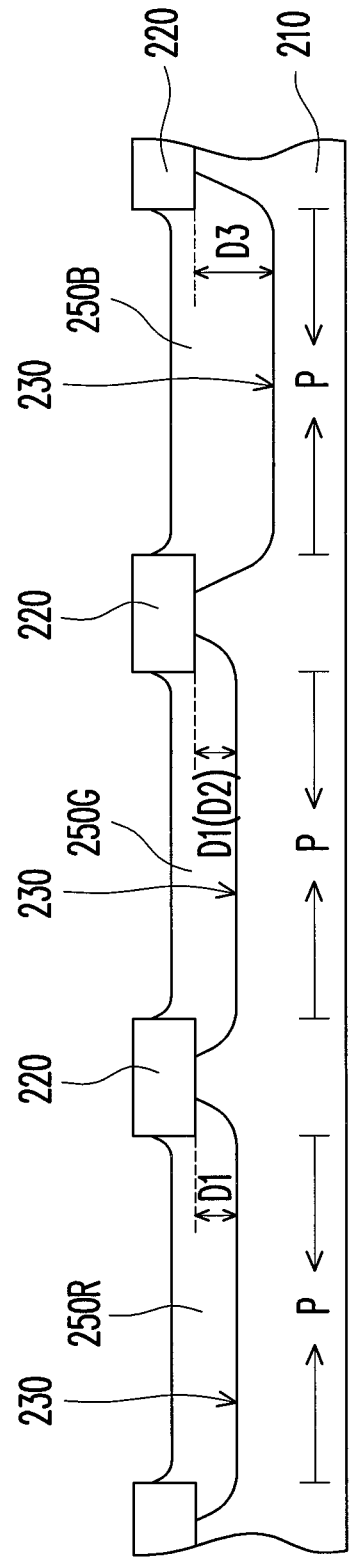

Then, as shown in FIG. 4C, after forming the grooves 230 with the second depth D2, a green filter film 250G is filled in the grooves 230 of a second part P2. Subsequently, as shown in FIG. 4D, part of the substrate 210 in the grooves 230 exposed by the black matrix layer 220, the red filter film 250R, and the green filter film 250G is removed using the black matrix layer 220, the red filter film 250R, and the green filter film 250G as a mask so that the exposed substrate 210 has a third depth D3. The method of removing part of the substrate 210 is, for example, performing a wet etching process using hydrofluoric acid (HF). Next, as shown in FIG. 4E, after forming the grooves 230 with the third depth D3, a blue filter film 250B is filled in the remaining grooves 230, as shown the grooves 230 of a third part P3 in FIG. 4E. As such, the color filter substrate 300 as in FIG. 3A is formed, wherein the thickness of the blue filter film 250B is substantially larger than the thickness of the green filter film 250G and the thickness of the green filter film 250G is substantially larger than the thickness of the red filter film 250R.

It should be noted that before the step of filling the green filter film 250G in the grooves 230 with the second depth D2 as shown in FIG. 4C, a treatment process (not shown) may selectively be performed on the surfaces of the black matrix layer 220 and the red filter film 250R. Similarly, before the step of filling the blue filter film 250B in the grooves 230 with the third depth D3 as shown in FIG. 4E, a treatment process (not shown) may selectively be performed on the surfaces of the black matrix layer 220, the red filter film 250R, and the green filter film 250G. The method of performing the treatment process is similar to that mentioned in the first embodiment, which will not be further illustrated hereinafter.

FIG. 5A to FIG. 5D are flow charts of the fabricating process of the color filter substrate as shown in FIG. 3B. The fabricating method of FIGS. 5A-5D is similar to that of FIGS. 4A-4E with the main difference lying in that grooves 230 with a second depth D2 are not formed in a color filter substrate 400 of the present embodiment. In other words, in the present embodiment, the depths D1 and D2 of the grooves that the red filter film 250R and the green filter film 250G are filled in are substantially equal to each other. Thus, the thickness of the blue filter film 250B is substantially larger than the thickness of the green filter film 250G and the thickness of the green filter film 250G is substantially equal to the thickness of the red filter film 250R.

It should be noted that the present invention does not limit the surface heights of the filter films of various colors to be equal. When color saturation of the color filter needs to be adjusted by using single-color filter films of different thicknesses, the thicknesses of the filter films in the present invention may be adjusted using grooves 230 with different depths D. The surface heights of the filter films with different thicknesses may align with one another. Thus, a protection layer which is used flatten the uneven surface of the color filter layer 250 in some applications of the color filter in the present embodiment can be omitted or a step of flattening with mechanical polishing can also be omitted. As such, not only is the color performance of the color filter increased but the fabricating processes are also simplified and the manufacturing costs are lowered. The grooves 230 with the undercut profiles U are adopted in the above two embodiments to overcome the problem in the conventional technology that color inks can not completely fill the pixel regions P.

The color filter substrate of the present embodiment is fabricated with the method in the abovementioned embodiments, for example. Alternatively, the fabricating processes and the shape of the grooves 230 with the undercut profiles U can be adjusted according to actual conditions and the material of the color filter layer 250 and the fabricating processes thereof are not limited by the present invention herein. Any fabricating methods in which grooves 230 with undercut profiles U are formed on a substrate 210 to avoid scum S or to prevent the problem that color inks can not completely fill pixel regions P fall with the protection scope claimed in the present invention.

Figure 6A:
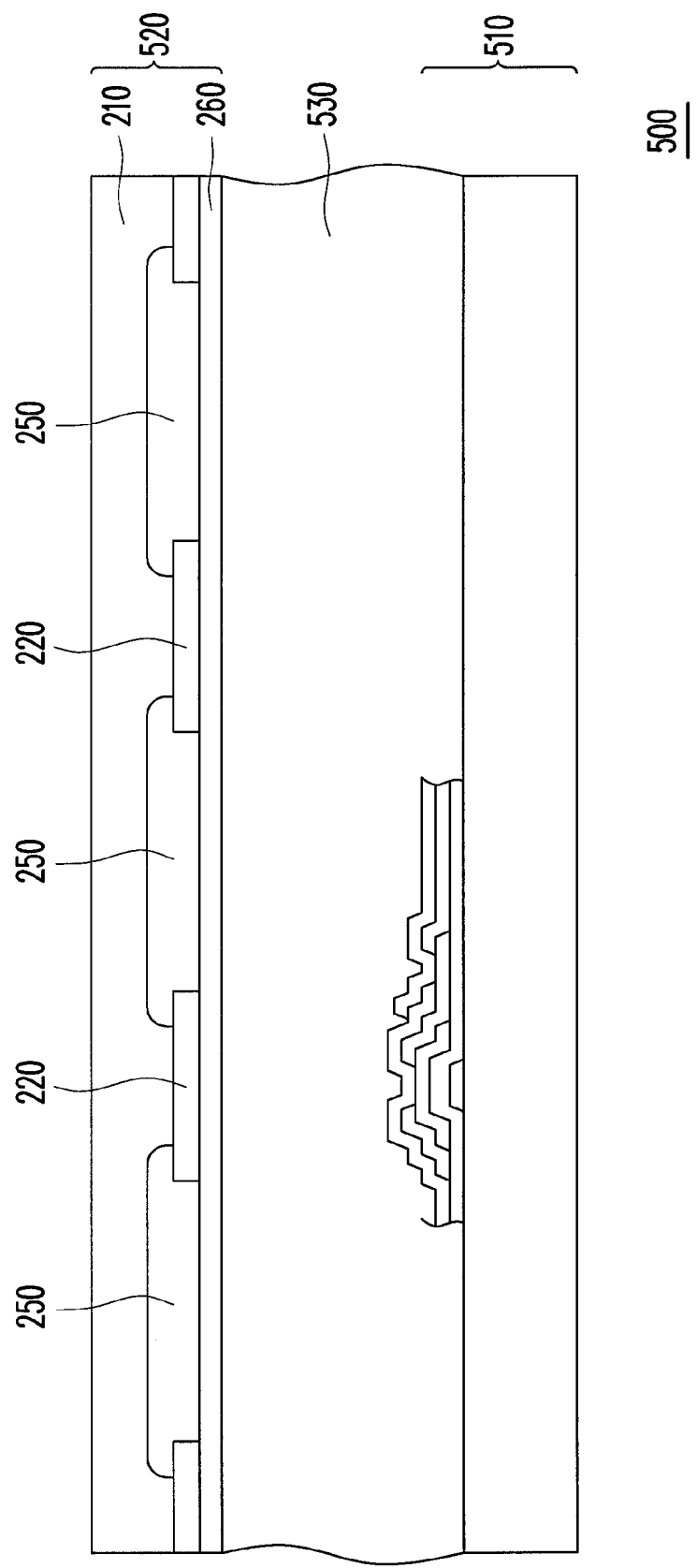
FIG. 6A and FIG. 6B are cross-sectional schematic diagrams of LCD panels using a color filter of the present invention.
Figure 6B:
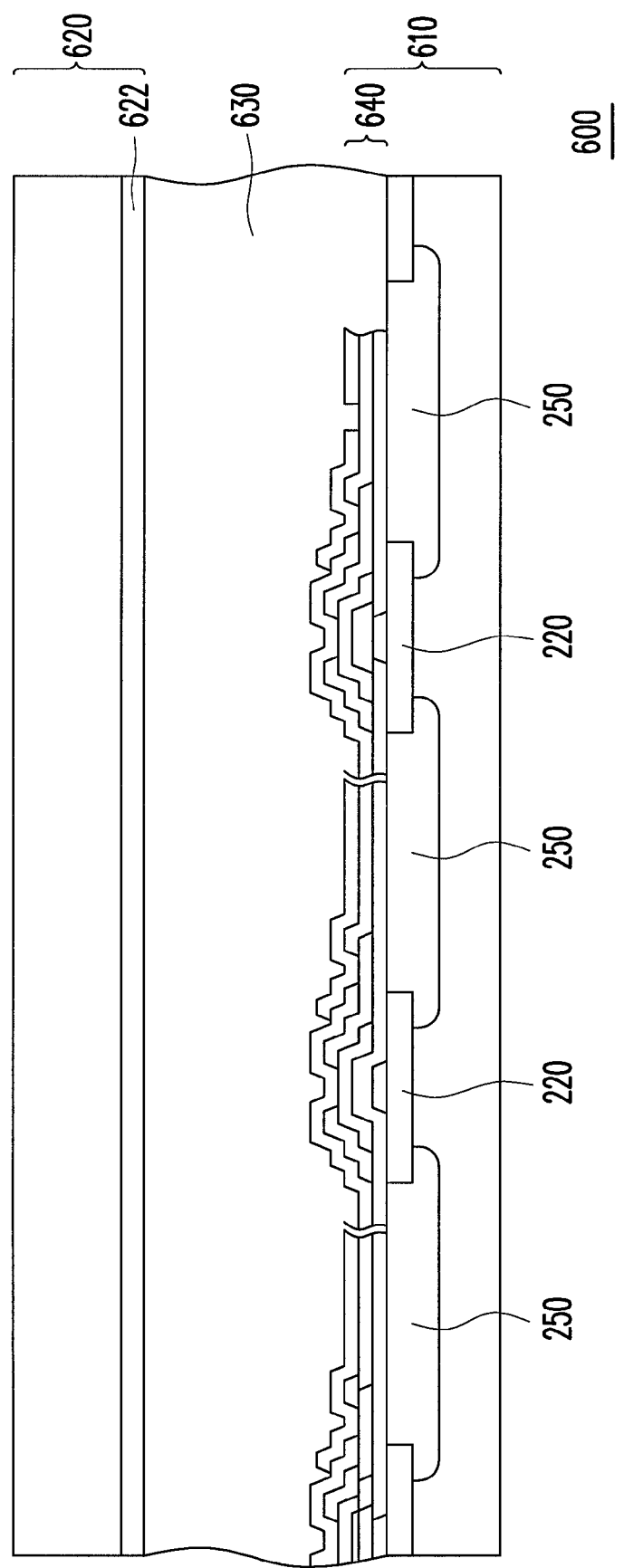

FIG. 6A and FIG. 6B are cross-sectional schematic diagrams of LCD panels using a color filter substrate of the present invention. An LCD panel 500 includes an array substrate 510, a color filter substrate 520, and a liquid crystal layer 530. The color filter substrate 520 is arranged opposite to the array substrate 510, and the liquid crystal layer 530 is sandwiched between the array substrate 510 and the color filter substrate 520. The color filter substrate 520 adopted here may be the color filter substrate disclosed in abovementioned embodiments or other embodiments. First, referring to FIG. 6A, in practical application aspects, the color filter substrate 520 may further include a transparent electrode layer 260 which covers a color filter layer 250 and a black matrix layer 220. Voltage difference between the transparent electrode layer 260 and pixel electrodes of the thin film transistors on the array substrate 510 enables liquid crystal molecules in the liquid crystal layer 530 to rotate by different degrees. The LCD panel is capable of full color display incorporating with the color filter layer 250.

Referring to FIG. 6B, in another application aspect, an active device array 640 may be directly disposed on the color filter layer 250 and the black matrix layer 220 to form an array on color filter substrate (AOC) 610. The AOC substrate 610, an opposed substrate 620 having a common electrode 622, and a liquid crystal layer 630 therebetween constitute an LCD panel 600 capable of full color display, as shown in FIG. 6B.

In summary, in the present invention, grooves with undercut profiles are formed on the substrate to form a color filter layer after color inks are filled in the grooves. In addition, the problem of scum may be overcome. Therefore, after a later treatment process, the problem that color inks can not completely fill pixel regions can be overcome and quality and yield can be further raised. In addition, an LCD that uses the color filter of the present invention may also have better display quality.

Although the present invention has been disclosed by the above embodiments, they are not intended to limit the present invention. Those skilled in the art may make some modifications and alterations without departing from the spirit and scope of the present invention. Therefore, the protection range of the present invention falls in the appended claims.

What is claimed is:
1. A color filter substrate, comprising:
a substrate having a plurality of grooves, wherein the grooves have undercut profiles;
a black matrix layer disposed on the substrate between each two adjacent grooves and part of the black matrix layer overlaps with part of the grooves, wherein the black matrix layer is not a part of the substrate, the grooves face the black matrix layer; and
a color filter layer filled only in the grooves of the substrate and including a plurality of filter films in the grooves separated from each other.

2. The color filter substrate according to claim 1, wherein each groove has a plurality of depths and a maximum depth of each groove is substantially equal to one another.

3. The color filter substrate according to claim 2, wherein a largest thickness of each filter film is smaller than the sum of a thickness of the black matrix layer and the maximum depth of each groove.

4. The color filter substrate according to claim 2, wherein the maximum depth is substantially smaller than the thickness of the black matrix layer.

5. The color filter substrate according to claim 2, wherein the maximum depth is substantially between 0.5 μm and 2 μm.

6. The color filter substrate according to claim 2, wherein the maximum depth is substantially 1 μm.

7. The color filter substrate according to claim 1, wherein the thickness of the color filter layer is substantially larger than the thickness of the black matrix layer.

8. The color filter substrate according to claim 1, wherein surfaces of the filter films are substantially planar.

9. The color filter substrate according to claim 1, wherein the grooves have different depths and the surfaces of the filter films are substantially on a same plane.

10. The color filter substrate according to claim 1, wherein the grooves have a first depth, a second depth, and a third depth, the filter films comprise a red filter film, a green filter film, and a blue filter film, the red filter film is filled in the grooves with the first depth, the green filter film is filled in the grooves with the second depth, and the blue filter film is filled in the grooves with the third depth.

11. The color filter substrate according to claim 10, wherein the first depth and second depth are substantially smaller than the third depth and the first depth is substantially equal to the second depth.

12. The color filter substrate according to claim 10, wherein the first depth and second depth are substantially larger than the third depth and the first depth is substantially equal to the second depth.

13. The color filter substrate according to claim 10, wherein the first depth is substantially smaller than the second depth and the second depth is substantially smaller than the third depth.

14. The color filter substrate according to claim 1, further comprising a transparent electrode layer covering the color filter layer and the black matrix layer.

15. The color filter substrate according to claim 1, further comprising an active array layer disposed on the color filter layer and the black matrix layer.

16. A color filter substrate, comprising:
- a substrate having a plurality of grooves, wherein the grooves have undercut profiles;
- a black matrix layer disposed on the substrate between each two adjacent grooves, wherein the undercut profiles of the grooves extend and direct contact to a part of the bottom of the black matrix layer, and the undercut profiles of the grooves and the black matrix layer are partially overlapped; and
- a color filter layer filled in the grooves of the substrate and including a plurality of filter films in the grooves separated from each other.

* * * * *